Feb. 6, 1934.                C. E. BAZLEY                1,946,185
                           FUEL TANK EJECTOR
                      Filed Aug. 15, 1930         3 Sheets-Sheet 1
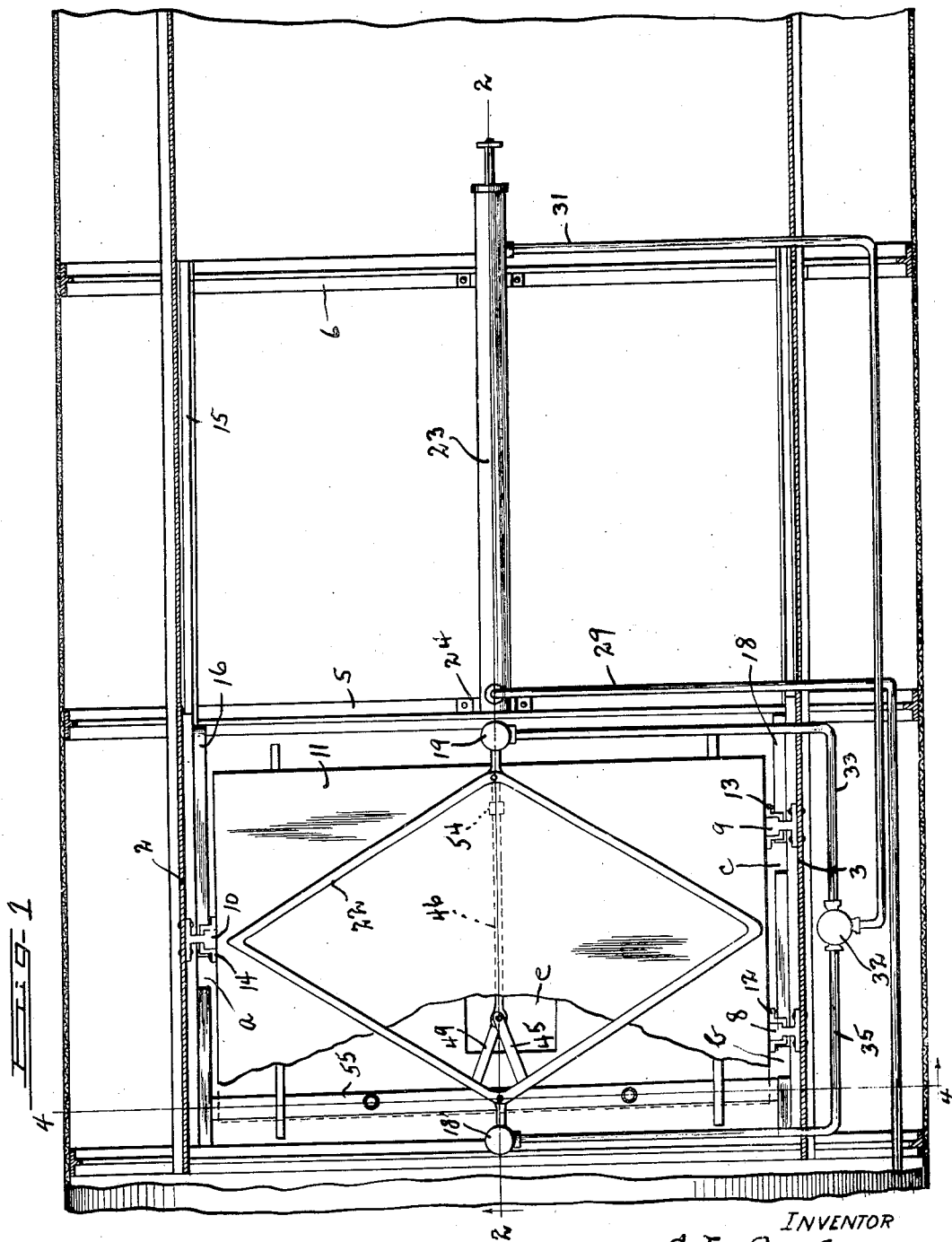
WITNESS
H. L. Meade.
INVENTOR
BY C. E. Bazley
Denison Thompson
ATTORNEYS

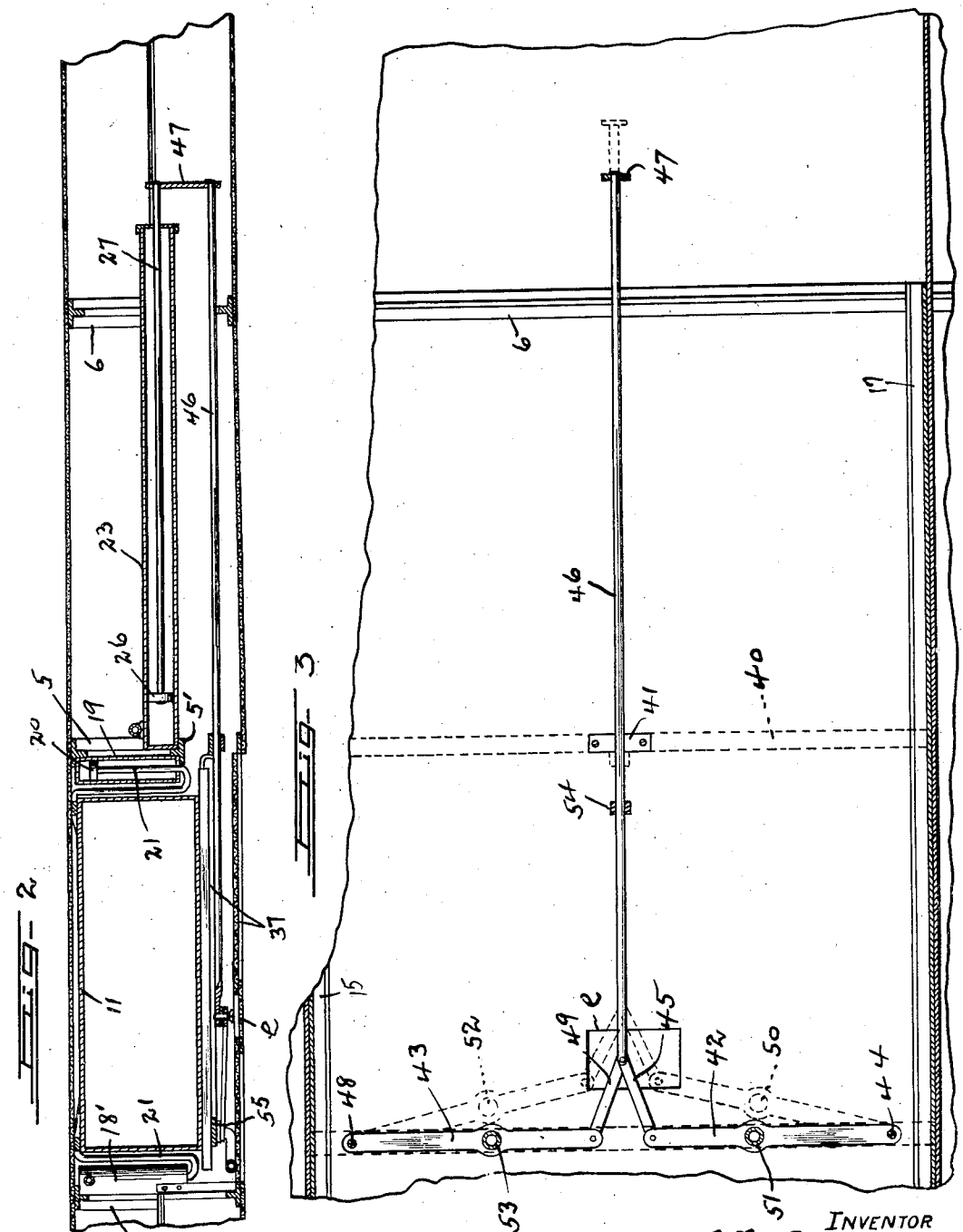
Feb. 6, 1934.  C. E. BAZLEY  1,946,185
FUEL TANK EJECTOR
Filed Aug. 15, 1930    3 Sheets-Sheet 2
INVENTOR
C. E. Bazley
BY
Denison & Thompson
ATTORNEYS
WITNESS
H. L. Meade.

Feb. 6, 1934.  C. E. BAZLEY  1,946,185
FUEL TANK EJECTOR
Filed Aug. 15, 1930  3 Sheets-Sheet 3
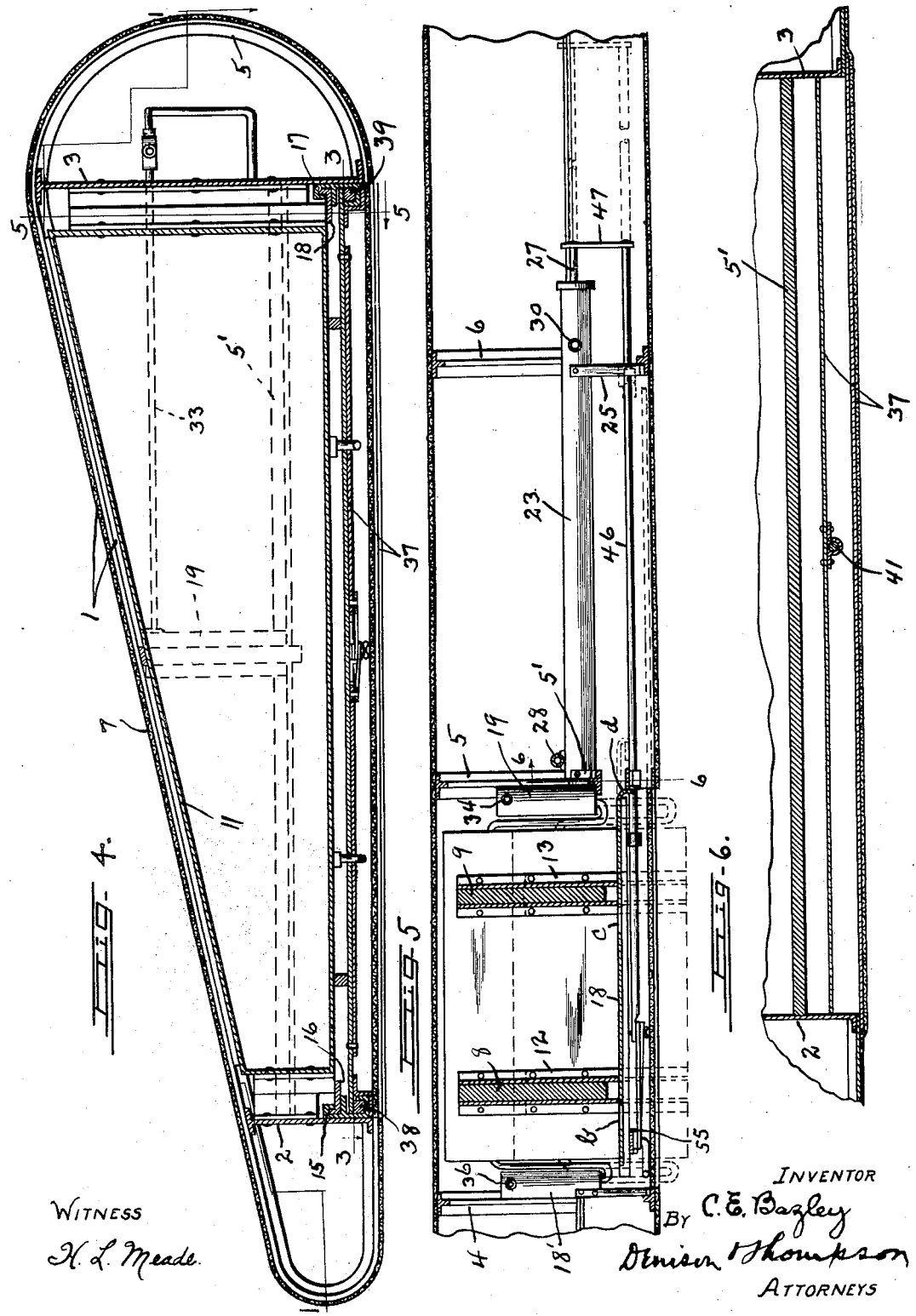
WITNESS
H. L. Meade.
INVENTOR
C. E. Bazley
By Denison Thompson
ATTORNEYS Patented Feb. 6, 1934

1,946,185

UNITED STATES PATENT OFFICE 1,946,185

FUEL TANK EJECTOR

Carl E. Bazley, Auburn, N. Y.

Application August 15, 1930. Serial No. 475,545

10 Claims. (Cl. 244—31)

This invention relates to a new and improved fuel tank ejector.

Although my device is adapted to be used on any self propelled vehicle using liquid fuel, it is particularly well adapted for use on aircraft, both of the heavier-than-air and the lighter-than-air types.

When a pilot is obliged to make a forced landing in which the aircraft is damaged to a greater or less extent, there is always the probability that the fuel in the fuel tanks will escape and become ignited with the result that the aircraft and its occupants are consumed in the resulting fire. This may take place irrespective of whether or not the pilot has cut off the ignition due to the fact that the engine itself may be sufficiently hot to ignite the fuel.

I am aware that different devices have been designed to remove the fuel from the aircraft while same is in flight. In some cases, provision is made whereby drain cocks may be opened, but the disadvantage of this arrangement is that it takes a considerable length of time for the tanks to become drained.

Other devices have been made in which the tanks are loosened from their supports and permitted to drop from the aircraft by gravity, but the disadvantage of this type of apparatus is that it will only function if the aircraft is properly positioned in the air and in the case of a forced landing, it is very improbable that the aircraft would be so positioned.

The main object of my invention is to provide a device whereby the fuel tanks may be positively and forcibly ejected from the vehicle irrespective of the position in which the vehicle may be.

Another object is to provide a device of this character which will require from the operator of the vehicle the manipulation of a single conveniently positioned lever.

Another object is to provide a device which is cheap to manufacture, positive in action and reliable.

Other objects and advantages relate to the size, shape and arrangement of parts, all as will more fully appear from the following description taken in connection with the accompanying drawings in which:—

Figure 1 is a section on line 1—1 of Figure 4.
Figure 2 is a section on line 2—2 of Figure 1.
Figure 3 is a section on line 3—3 of Figure 4.
Figure 4 is a section on line 4—4 of Figure 4.
Figure 5 is a section on line 5—5 of Figure 4.
Figure 6 is a section on line 6—6 of Figure 5.

Although my device is capable of being used in various types of vehicles, which are provided with fuel tanks, it is particularly well adapted for use in aeroplanes, and for the purpose of explaining it, I have here shown it in conjunction with the fuel tank of an aeroplane such fuel tank as here shown being situated in the wing of the aeroplane.

Referring to Figures 4 and 5, the wing 1 comprises a frame having adjacent one longitudinal edge a longitudinally extending channel iron 2 with a companion channel iron 3 adjacent the opposite longitudinal edge of the wing 1. To the channels 2 and 3 are secured as by welding a plurality, three only being shown, of spaced braces 4, 5 and 6, such braces being of such a configuration as to secure the canvas covering 7 of the wing 1 in the desired shape.

Referring to Figure 1, I provide on channel 3 two spaced vertically extending guide rails 8 and 9 and on channel 2, I provide a single similar guide rail 10. The fuel tank 11 has secured to one end, spaced elongated clips 12 and 13 adapted to ride on guides 8 and 9 respectively. On the opposite end of tank 11 I provide a similar clip 14 adapted to ride on guide 10.

The guides and clips just described serve to direct the movement of the tank 11 when it is ejected from the wing 1 and they also serve to hold the tank against movement in relation to the wing 1 when the tank is in position.

To the inner face of channel 2 is secured a guide plate 15 in which is positioned for sliding movement, an inwardly extending plate 16. Plate 16 is normally in the path of movement of clip 14 so that the end of tank 11 carrying clip 14 is held against downward movement.

Plate 16 is cut away as shown at $a$ for a purpose hereinafter to be described.

A similar guide plate 17 is secured to channel 3 and carries a slidable plate 18 which is normally in the path of movement of clips 12 and 13 on tank 11 to hold the same against downward displacement in wing 1. Plate 17 is cut away as shown at $b$ and $c$ for a purpose hereinafter to be described.

Adjacent one side of tank 11 is secured to brace 4 a vertically extending cylinder 18' and on the opposite side of tank 11 a cylinder 19 is secured to brace 5.

Cylinders 18' and 19 are similar in construction and each is provided, as may be seen from Figure 2, with a piston 20 having a piston rod 21.

The piston rods 21 are returned bent upwardly between the walls of cylinders 18' and 19 and the side walls of tank 11. The upper ends of piston rods 21 are secured to opposite sides of a diamond-shaped frame 22 which rests on the upper surface of tank 11. Frame 22 extends approximately from end to end of tank 11 in both directions.

A cylinder 23 extends longitudinally of wing 1 and has one end secured as by a bracket 24 to brace 5 and has its other end secured in a saddle 25 which is supported on brace 6. Cylinder 23 has a piston 26 and a piston rod 27. The end of cylinder 23 adjacent tank 11 has an intake orifice 28 connected as by a pipe 29 to a source of compressed air, none here being shown.

Adjacent the opposite end of cylinder 23 is an orifice 30 connected as by a pipe 31 to a header 32. A pipe 33 leads from the header 32 to an orifice 34 in the upper end of cylinder 19 and a pipe 35 leads from header 32 to an orifice 36 in the upper end of cylinder 18.

In the undersurface of wing 1 directly beneath the tank 11 is provided a sliding gate 37 having on its opposite longitudinal edges, opposed guide rails 38 and 39 which are positioned respectively in guide plates 15 and 17.

Gate 37 is provided with a centrally positioned transverse brace 40 provided at its central point with a collar 41.

On one end of gate 37, I provide a pair of pipe cutters 42 and 43. Cutter 42 has one end pivoted at 44 on gate 37 and has its other end connected by a link 45 to a rod 46 which extends through collar 41 and which is connected at its outer end as by a bar 47 to the outer end of piston rod 27. Similarly, cutter 43 is pivoted as at 48 on gate 37 and has its other end connected by the link 49 to rod 46.

Cutter 44 has an aperture 50 provided with a shearing edge through which the discharge pipe 51 of tank 11 extends. Similarly, cutter 43 has an aperture 52 with a shearing edge through which a second discharge pipe 53 from tank 11 extends.

A stop 54 is secured to rod 46 and normally is spaced a short distance from collar 41.

One end of the slides 16 and 18 is curved downwardly as indicated at $d$ on Figure 5. The gate 37 has a superimposed cross brace 55 which extends a sufficient distance above the upper surface of gate 37 to contact with the curved ends of slides 16 and 18 and move them in the guides 15 and 17.

A portion 5' of brace 5 is cut and secured to channels 2 and 3 at a height to permit the passage thereunder of gate 37.

*Operation*

When the pilot desires to have the gas tank ejected from the plane, he opens a conveniently positioned valve, none here being shown, which permits compressed air from the source of supply to flow through conduit 29 into cylinder 23. This will cause piston 26 to be moved longitudinally in cylinder 23 carrying with it piston rod 27. Piston rod 27 being connected to rod 46, rod 46 will be carried longitudinally of the wing 1. This movement of rod 46 will, through links 45 and 49, cause cutters 42 and 43 to be moved about their pivots shearing off outlet conduits 51 and 53.

Immediately after the shearing operation, the stop 54 will contact with the collar 41 on the gate 37 and the further movement of rod 46 will cause the gate 37 to be moved in the guides 15 and 17 to expose the bottom of tank 11. During this initial movement of gate 37, the slides 16 and 18 will be unaffected so that the tank 11 will remain in position.

As the gate 37 approaches its limit of movement, the cross brace 55 will contact with the curved ends of slides 16 and 18 to cause them to be moved in guides 15 and 18' to bring guide 16 into a position where its cut away portion $a$ will be in registration with the clip 14 on tank 11. Similarly, plate 18 will be moved to a position where its cut away portions $b$ and $c$ will be in registration with clips 12 and 13 on tank 11.

When plates 16 and 18 are in the last described position, there will be nothing to interfere with the movement of tank 11 from wing 1.

At the instant guides 16 and 18 are moved to the unlocking position, the piston 26 in cylinder 23 will pass beyond the orifice 30 in cylinder 23 and the compressed air will then pass through conduit 31 to header 32 and thence through conduits 33 and 35 to cylinders 19 and 18. The pistons 20 in cylinders 18 and 19 will then be moved longitudinally of such cylinders carrying with them piston rods 21 and frame 22 and positively carry outwardly, tank 11 from wing 1 irrespective of the position of wing 1.

If it is desired to have access to the interior of the wing 1, the gate 37 may be manually moved longitudinally of wing 1 to a position short of that in which the cross brace 55 will contact with the slides 16 and 18. In this position, the gate 37 is open to practically the greatest extent but the tank 11 is still locked in position in wing 1. Before this is done, the links 45 and 49 are disconnected from rod 46 to make cutters 42 and 43 inoperative and to permit of this being done, I provide a normally covered hand opening in gate 37, as indicated on Figures 1 and 2.

I have here shown and described a single wing of an aeroplane but it will be understood that if a fuel tank is carried in both of the wings of an aeroplane as is usually the case, ejecting mechanism will be provided for both tanks and will be simultaneously operated when the actuating valve is opened by the pilot.

It will also be understood that my invention is adapted to be used with other vehicles or apparatus in addition to the one here described, the invention being in a means for providing an apparatus which will positively eject a fuel tank from a vehicle or other structure. The type of vehicle or structure in which the invention is to be used, is immaterial.

It will also be understood that although I have here shown a particular manner of carrying out my invention, various other ways and means may be provided without departing from the spirit of my invention, for although I have shown and described a specific structure and form and relation of parts as an exemplification of an embodiment of my invention, I do not desire to restrict myself to the exact size, shape or arrangement of parts, as various changes may be made within the scope of the appended claims.

I claim:

1. In a device of the class described, a vehicle, a compartment in the vehicle, a closure for the compartment, a fuel tank in the compartment, means for releasably securing the fuel tank in position, means for opening the closure, means actuated by the opening of the closure for moving the securing means to the releasing position, and means for positively ejecting the tank from the compartment.

2. In a device of the class described, a vehicle, a compartment in the vehicle, a closure for the compartment, a fuel tank in the compartment, means for releasably securing the fuel tank in position, means for opening the closure, means actuated by the opening of the closure for moving the securing means to the releasing position, means for positively ejecting the tank from the compartment, said means comprising a cylinder, a piston therein, and a source of air under pressure for actuating the piston.

3. In a device of the class described, a vehicle, a compartment in the vehicle, a closure for the compartment, a fuel tank in the compartment, means for releasably securing the fuel tank in position, means for opening the closure comprising a fluid-actuated piston, means for actuating the piston, means actuated by the opening of the closure for moving the securing means to the releasing position, means for positively ejecting the tank from the compartment comprising a fluid-actuated piston, and means for actuating the second-named piston after the first-named piston has been actuated.

4. In a device of the class described, a vehicle, a compartment in the vehicle, a closure for the compartment, a fuel tank in the compartment, means for releasably securing the fuel tank in position, means for opening the closure, means for moving the securing means to the releasing position, and means automatically controlled by said closure opening means for positively ejecting the tank from the compartment.

5. In a device of the class described, a vehicle, a compartment in the vehicle, a closure for the compartment, a fuel tank in the compartment, means for releasably securing the fuel tank in position, means for opening the closure comprising a fluid-actuated piston, means for actuating the piston, means for moving the securing means to the releasing position, means for positively ejecting the tank from the compartment comprising a fluid-actuated piston, and means for actuating the second-named piston after the first-named piston has been actuated.

6. In a device of the class described, a vehicle, a compartment in the vehicle, a closure for the compartment, a fuel tank in the compartment, means for releasably securing the fuel tank in position independently of the closure, means for opening the closure, and means actuated by the opening of the closure for moving the securing means to the releasing position.

7. In a device of the class described, a vehicle, a compartment in the vehicle, a fuel tank in the compartment, means for releasably securing the fuel tank in position, actuating means for moving the securing means to the releasing position, and means automatically controlled by said actuating means for positively ejecting the tank from the compartment.

8. In a device of the class described, a vehicle, a compartment in the vehicle, a closure for the compartment, a fuel tank in the compartment, means for releasably securing the fuel tank in position, means for opening the closure, and means automatically controlled by said closure opening means for moving the securing means to the releasing position and for positively ejecting the tank from the compartment.

9. In a device of the class described, a vehicle, a compartment in the vehicle, a closure for the compartment, a fuel tank in the compartment, means for releasably securing the fuel tank in position, means including a piston adapted to be operated by fluid pressure for opening said closure, said tank having a discharge pipe connected therewith, and means actuated by said piston for severing said discharge pipe.

10. In a device of the class described, a vehicle, a compartment in the vehicle, a fuel tank in the compartment, means for releasably securing the fuel tank in position, said tank having a discharge pipe connected therewith, and means including a piston adapted to be actuated by fluid under pressure for severing said discharge pipe.

CARL E. BAZLEY.